US009384466B2

(12) United States Patent
Kunisetty et al.

(10) Patent No.: US 9,384,466 B2
(45) Date of Patent: Jul. 5, 2016

(54) SYSTEMS AND METHODS FOR EXTENDING ANY SERVICE TO EXISTING SYSTEMS BY USING AN ADAPTIVE COMMON INTERFACE

(71) Applicant: Oracle International Corporation, Redwood City, CA (US)

(72) Inventors: Sunil Kunisetty, Fremont, CA (US); Daniel Chan, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 601 days.

(21) Appl. No.: 13/627,791

(22) Filed: Sep. 26, 2012

(65) Prior Publication Data

US 2014/0089490 A1 Mar. 27, 2014

(51) Int. Cl.
*G06F 15/173* (2006.01)
*G06Q 10/10* (2012.01)
*G06F 9/54* (2006.01)

(52) U.S. Cl.
CPC .............. *G06Q 10/10* (2013.01); *G06F 9/541* (2013.01)

(58) Field of Classification Search
CPC ...................................................... G06F 9/541
USPC ......................................................... 709/224
See application file for complete search history.

(56) References Cited

U.S. PATENT DOCUMENTS

| 7,849,472 | B1* | 12/2010 | Fuchs | H04L 41/0273 709/217 |
|---|---|---|---|---|
| 8,522,137 | B1* | 8/2013 | Brown | G06F 17/21 715/234 |
| 2004/0030627 | A1* | 2/2004 | Sedukhin | G06Q 40/00 705/36 R |
| 2006/0150200 | A1* | 7/2006 | Cohen | G06F 9/547 719/328 |
| 2007/0283317 | A1* | 12/2007 | Sadler | G06F 9/465 717/103 |
| 2008/0120327 | A1* | 5/2008 | Bhat | G06F 17/3089 |
| 2008/0189402 | A1* | 8/2008 | Betzler | H04L 12/2602 709/223 |
| 2009/0024561 | A1* | 1/2009 | Palanisamy | G06F 17/30174 |
| 2009/0164621 | A1* | 6/2009 | Kothari | H04L 12/2602 709/224 |
| 2010/0094884 | A1* | 4/2010 | Baldwin | G06F 17/3089 707/755 |
| 2010/0114620 | A1* | 5/2010 | Diament | G06F 17/3089 707/755 |
| 2011/0145699 | A1* | 6/2011 | Kheiri | G06F 8/73 715/236 |

(Continued)

*Primary Examiner* — Imad Hussain
(74) *Attorney, Agent, or Firm* — Precision IP

(57) ABSTRACT

Aspects of the present disclosure extend to methods and systems for extending services to existing enterprise systems. In various aspects, one or more service clients may be implemented to provide various functionalities for invoking a specific service that may be protocol dependent. The service client defines a set of standard service properties to specify how to access the specific service. An asset of an enterprise system intending to consume the service may integrate with the service client of the specific service and provide the standard service properties to the service client for service invocation.

21 Claims, 5 Drawing Sheets

(56) References Cited

U.S. PATENT DOCUMENTS

| | | | | |
|---|---|---|---|---|
| 2011/0296011 A1* | 12/2011 | Dare | .................. | G06F 9/544 709/224 |
| 2012/0079066 A1* | 3/2012 | Li | ..................... | H04L 67/26 709/217 |
| 2012/0233588 A1* | 9/2012 | Mruthyunjaya | .......... | G06F 8/30 717/105 |
| 2012/0233595 A1* | 9/2012 | Ghanathe | .................. | G06F 8/30 717/123 |
| 2012/0254899 A1* | 10/2012 | Sharma | .................. | G06F 9/541 719/328 |
| 2012/0254904 A1* | 10/2012 | Brown | .................. | G06F 9/541 719/328 |
| 2013/0067476 A1* | 3/2013 | Rosenberg | ........... | G06F 9/4843 718/100 |
| 2013/0124807 A1* | 5/2013 | Nielsen | ............... | G06F 11/1438 711/162 |
| 2013/0132584 A1* | 5/2013 | Palladino | ................ | H04L 65/40 709/226 |
| 2013/0160130 A1* | 6/2013 | Mendelev | ............... | G06F 21/56 726/25 |
| 2013/0173719 A1* | 7/2013 | Ahmed | .................. | H04L 67/12 709/206 |
| 2013/0308629 A1* | 11/2013 | Cai | .................... | H04L 12/6418 370/352 |
| 2014/0033170 A1* | 1/2014 | Nimashakavi | .... | G06F 17/30893 717/120 |
| 2014/0053166 A1* | 2/2014 | Moore | ..................... | G06F 9/54 719/316 |

* cited by examiner

SYSTEMS AND METHODS FOR EXTENDING ANY SERVICE TO EXISTING SYSTEMS BY USING AN ADAPTIVE COMMON INTERFACE

TECHNICAL FIELD

Aspects of the present disclosure relate to computing systems, and in particular, systems and methods for extending enterprise systems.

BACKGROUND

An "enterprise system" represents a large-scale software product designed to integrate various computing systems and/or resources of an organization, such as a business enterprise or governmental entity. In particular, enterprise systems provide core business processes (such as sales, accounting, finance, human resources, inventory and manufacturing) in the form of reusable modules, functions, and/or services that allow for collaboration and communication across the entire enterprise. Thus, an enterprise system includes software components that model various phases of an organization's operation to facilitate cooperation and coordination of work across the organization.

As businesses become more sophisticated and technologically complex and as business requirements and opportunities change, many businesses will require the expansion or extension of existing enterprise systems. However, due to their complexity, size, and/or fragmented nature, many enterprise systems cannot be efficiently expanded, adapted, or extended. For example, extending existing enterprise systems often results in the creation of redundant functionality and data, all of which may lead to support and maintenance issues. It is with these problems in mind, among others, that various aspects of the present disclosure were conceived.

SUMMARY

One aspect of the present disclosure involves a system for extending services to existing systems. The system includes at least one processor. The processor is configured to invoke a service client to enable at least one asset of an enterprise system to access at least one service by accessing target data corresponding to at least one target instance to determine whether a property interface is specified, the at least one target instance corresponding to the at least one asset. When a property interface is specified, the at least one processor may be further configured to invoke the service client to enable the at least one asset of the enterprise system to access the at least one service by converting a portion of the target data to a standard format corresponding to the service client.

Aspects of the present disclosure include methods for extending services to existing systems. The method includes various steps executable by a processor. The method includes invoking a service client to enable at least one asset of an enterprise system to access at least one service by: accessing target data corresponding to at least one target instance to determine whether a property interface is specified, the at least one target instance corresponding to the at least one asset. When a property interface is specified, the method may further include converting a portion of the target data to a standard format corresponding to the service client.

Aspects of the present disclosure include non-transitory computer readable mediums encoded with a management server application. The management server application includes modules executable by a processor. The modules include a service module to invoke a service client to enable at least one asset of an enterprise system to access at least one service by: accessing target data corresponding to at least one target instance to determine whether a property interface is specified, the at least one target instance corresponding to the at least one asset and when a property interface is specified, converting a portion of the target data to a standard format corresponding to the service client.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Figure 1:
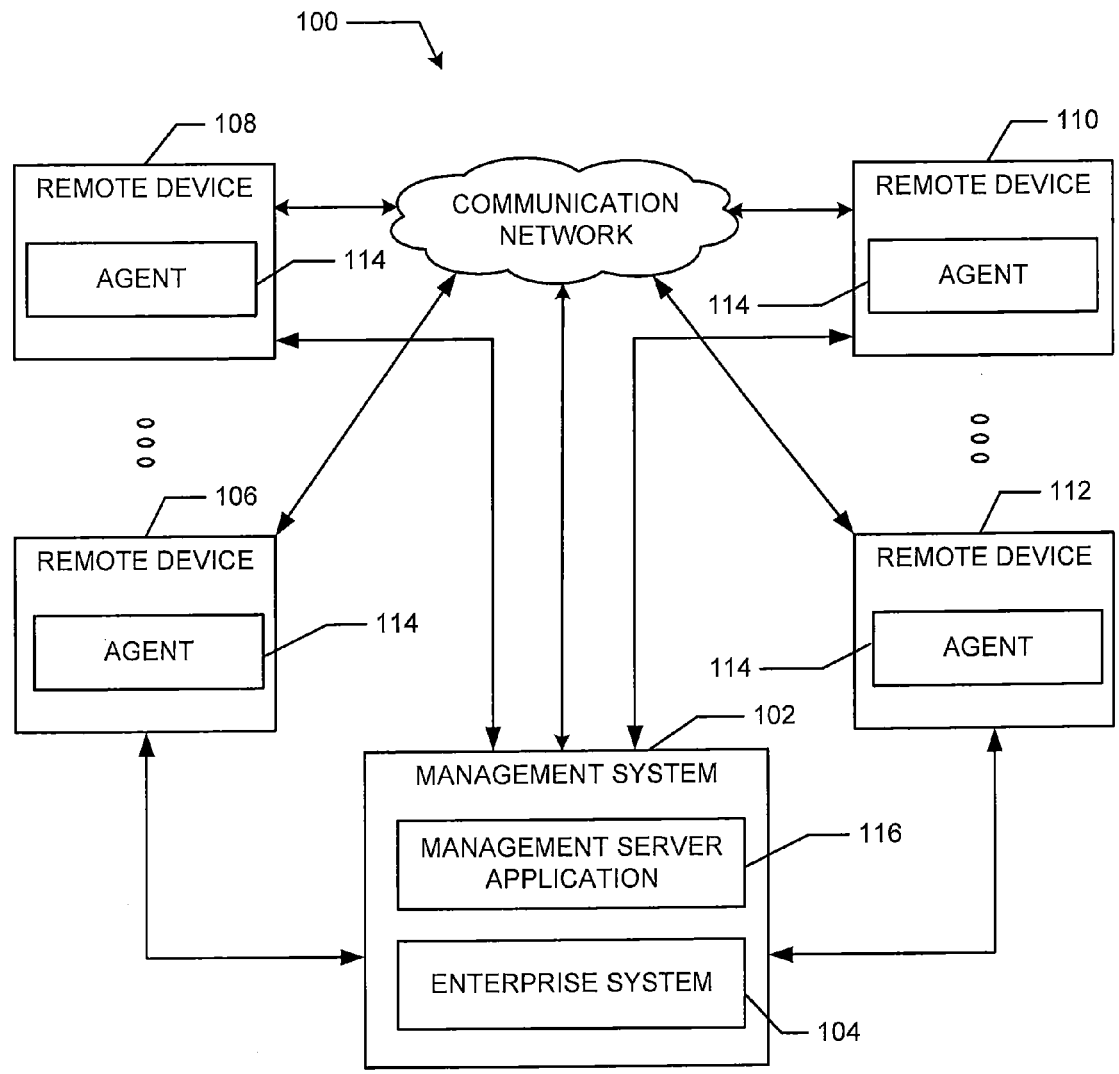
FIG. 1 is an example computing environment for a services system in accordance with one aspect of the present disclosure.

Aspects of the present disclosure describe methods and systems for extending a service to an enterprise system using adaptive interfaces. In various aspects, a service client may be implemented that is capable of accessing the service. The service client may define a set of standard service properties specifying how to access the service. Subsequently, the service client may be integrated or otherwise associated with various application modules, applications, business assets and/or business processes of the enterprise system effectively enabling the application modules, applications, assets and/or processes to use, access, or otherwise consume the services. If the application module, application, asset and/or process of the enterprise system cannot provide the data required by the service client, an adaptive interface may be provided to which the asset may adapt to convert data received from the application module, application, business asset and/or business process of the enterprise system to the set of standard service properties required by the service client.

A "service" refers to a set of related software functionalities that may be reused for different purposes. In the context of a business enterprise system, individual services may be provided for various business functionalities such as: sales, accounting, finance, human resources, inventory and manufacturing, etc. For example, a service may be provided to perform security enforcement for a retail enterprise to control access to all of its existing customer information, profiles and/or databases, etc. A service client provides a mechanism to consume (e.g., access or use) a particular service. For example, as will be described below, a fetchlet represents a specific type of service client that may be used to consume specific services.

Many organizations implement sophisticated enterprise systems to perform and support various business tasks. Generally, the enterprise system may include various software components such as any disparate, external, internal, custom, and/or proprietary business software applications, application modules, databases, systems, packaged commercial applications, file systems, and/or any other type of technology component capable of performing a particular task, business task, business operation, and/or provide access to business data (referred to herein as an "asset"). For example, assets for a retail enterprise system may include: a customer management application, a customer service application, and a SQL Server™ customer profile management database.

The Enterprise systems use services to access, integrate or extend the different assets that make up the enterprise system. Generally, the services are designed to interface with existing computing resources of an enterprise system and any corresponding assets. Referring to the retail enterprise system example, any services generated for the retail enterprise were initially designed to interface and/or be consumed by the various assets currently existing within the retail enterprise, such as the customer management application and customer profile management database.

However, the assets within an enterprise system may require access to new services (e.g. Web services, JMS services) due to maintenance, upgrades, and/or new requirements. Referring to the retail enterprise example, the enterprise may have to continuously upgrade its security mechanisms, applications, application modules, and/or functions to keep pace with the rapid changes in technology, such as new web-based technologies for accessing customer information and data. To implement such upgrades, the existing security mechanisms may require access to one or more new services.

The integration between and/or extension of the existing assets of the enterprise system and a new service may present challenges. For example, existing assets that are already developed and being used in production typically have their own protocols and standards to model and store information internally. For example, two existing assets of a given enterprise system, such as a web application and a database, may implement a service endpoint interface to access services. A service endpoint interface represents an abstraction of a service that allows clients of the service to identify and communicate with the service. In particular, an end point may indicate a specific location for accessing the particular service using a specific protocol and data format, such as a uniform resource identifier ("URI"). In order to access the new service, the web application may store the endpoint as a whole piece of data while the database may break the end point into multiples pieces of data (e.g., when applied to web service context, the data may be broken down into pieces describing the protocol, host name, port number, and application name, corresponding to the application module). Thus, the web application would require the new service to interface with an endpoint being stored as whole piece of data, while the database would require the new service to interface with multiple pieces of data.

The resulting mismatch of data modeling (i.e., storing data in whole or in parts) by the enterprise system assets may present challenges when attempting to integrate and/or access a new service. Conventional methods for handling such integration challenges include implementing individual service clients for each existing application, application module, and/or functions of the enterprise management system. For example, if an enterprise system included three separate applications and three databases, six individual service clients would be implemented—one for each of the three separate applications and one for each of the three separate databases. Such a solution results in the development of numerous application modules with identical functionalities, which may ultimately lead to technical support and maintenance issues. Aspects of the present disclosure address such issues by extending services to existing assets of an enterprise system using adaptive interfaces. An adaptive interface represents a type of interface that adapts or changes various aspects of an existing system to another to enable one or more systems to communicate that otherwise could not because of incompatible interfaces.

FIG. 1 illustrates an example computing environment 100 for extending services to existing enterprise systems using an adaptive interface. The computing environment 100 includes a management system 102 capable of monitoring and/or managing assets of an enterprise system 104. In particular, the management system 102 may implement and execute various applications and/or processes to monitor the assets of the enterprise system 104 and extend one or more services to the enterprise system 104 when required.

The management system 102 may be a personal computer, work station, server, mobile device, mobile phone, tablet device, processor, and/or other processing device capable of implementing and/or executing server processes, software, applications, etc. The management system 102 may include one or more processors that process software or other machine-readable instructions and may include a memory to store the software or other machine-readable instructions and data. The memory may include volatile and/or non-volatile memory. Additionally, the management system 102 may also include a communication system to communicate via a wireline and/or wireless communications, such as through the Internet, an intranet, an Ethernet network, a wireline network, a wireless network, a mobile communications network, and/or another communication network, such as communications network 118. The management system 102 may include a user-interface (UI) (not shown) for a user to provide input and may include a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input.

The management system 102 may monitor various assets of the enterprise system 104 that collectively define, implement, coordinate and/or execute various attributes, behaviors, or business functionalities of a particular organization, entity, or business, such as business processes, information flows, reporting, functionalities, and/or data analytics for the particular organization. While the enterprise system 104 is depicted as being located locally on the management system 102, it is contemplated that the enterprise system 104 could be located elsewhere and/or external to the management system 102. In one embodiment, the assets of the enterprise system 104 may be located and/or otherwise distributed between the various remote devices 106-112.

The various assets of the enterprise system 104 may be modeled in the form of one or more target instances. A target instance represents a specific realization of a particular enterprise asset. For example, if the enterprise system 104 included a database, a target instance may be a specific instance of the database located at the remote device 106. Alternatively, if the enterprise system 104 included a web server, the target instance may be a web server executing on the remote device 106. It is contemplated that any number of target instances may exist, and may correspond to any application, application modules, asset, and/or function of the enterprise system 104.

Each target instance may correspond to or otherwise be associated with "target metadata", such as a target metadata file, based on the instance type. For example, if a target instance "X" represents an instance of a database, "X" will correspond to a database target metadata. Alternatively, if "X" represented an instance of an application server, "X" would correspond to or otherwise be associated with an application server target metadata.

The target metadata and/or target metadata file may include metrics information describing the target instance. Metrics information includes information that may be used to facilitate the monitoring of the specific asset corresponding to the target instance. For example, the metrics information may include "metrics," which are specific pieces of data dynamically collected from a target/target instances. In particular, metrics represent units of measurement or key performance indicators that may be used to determine, qualify, and/or quantify the health of a target instance. In one embodiment, the metrics may be push metrics. In a push metric model, notifications are sent asynchronously from the target instance, without being requested. Alternatively, the metrics may be pull metrics. In a pull metric model, the target instance is polled for metric data and/or metric information. The frequency at which metrics and/or metric data may be collected may be defined in a default collection file according to a collection schedule. For example, the collections of metrics may occur every 24 hours, or according to some other temporal delineation. Examples metrics may include, CPU utilization, free available memory, Disk I/O throughputs, network bandwidth utilization, total active database connection, etc. Each target may include a predefined set of metrics.

The metrics may include or otherwise be associated with one or more thresholds. Thresholds are boundary values that may be compared against monitored metric values. For example, various metrics may be compared to a warning threshold so that when a metric value exceeds the warning threshold, a warning alert is generated. Such an alert may provide notification of impending problems related to the target instance that may be addressed in a timely manner. Additionally, such alerts may be associated with the automatic execution of a job, etc. Alerts may be detected through a polling-based mechanism by checking for the monitored condition at regular, predefined intervals. The majority of the Enterprise Manager metric-based alerts implement polling-based processes. In particular, various metrics information and/or data may be polled by the service client (Agent/fetchlet) to the Service. Once such metric information and/or metric data is received, an Agent may compare the metric data against a threshold. If the metric data is crosses, exceeds, etc., the threshold, then alerts may be generated by the Agent, or alternatively, various alerts may be generated by the Management system 102.

The target metadata may define at least one metric group. A metric group refers to a collection of metrics that may be commonly categorized and collected during the same target instance invocation. For example, a Java® Virtual Machine ("JVM") metric group may contain metrics for Active Daemon Threads, Active Threads, CPU Usage (%), Free Heap (MB), Heap Usage (%), Heap Usage (MB), JDK Vendor, JDK Version, etc. For each metric group, a service client, such as a fetchlet (will be described in detail below) used to invoke or otherwise extend the service to the target instance may be specified.

The target metadata and/or target metadata file may include a set of instance properties that identify and/or connect to the asset corresponding to the particular target instance to one or more services. Target instance properties represent named values that may be used for computing the metrics of the target and/or for display in the home page of the target. In one particular embodiment, the instance properties are static, and are populated when a target instance is created. The list of target instance properties is specified in the target metadata to allow data driven user interfaces to register targets and, in one particular embodiment, for the Oracle Management Agent to validate that a target instance is complete.

For example, if the enterprise system 104 included four (4) databases "A, B, C and D," and two application servers, "App1" and "App2," the management system 102 may include six corresponding target instances, one for each database and each application servers. Each of the four database target instances may correspond to a database target metadata file describing the specific characteristics of the database target type, such as a metric model corresponding to databases and various properties for the database target instances. Each of the two application server target instances (i.e. one for App1 and App2) may correspond to an application server target metadata file describing the specific characteristics of the application target type, such as a specific metric model corresponding to the application server and various properties defined for the application server target type. Additionally, the four target instances representing the four databases (i.e. A, B, C and D), may include a set of instance properties for accessing services and two target instances representing App1 and App2 may include a set of instance properties for accessing services.

In one example embodiment, the target metadata may be received in the form of a plug-in file. A plug-in represents a set of software components that adds specific abilities to a larger software application. Alternatively, the plug-in may include the data and/or information that can be exposed to an asset. Accordingly, the metadata and properties may be provided to the management system 102 as a plug-in. All of the instance properties for all of the various target instances being monitored may be stored in a single file, such as an XML (Extensible Markup Language) file, and may be stored on the remote devices 106-112, or elsewhere.

The computing environment 100 includes one or more remote devices 106-112 for monitoring the assets of the enterprise system 104. The remote devices 106-112 may be a personal computer, work station, server, mobile device, mobile phone, tablet device, processor, and/or other processing device. Each remote device 106-112 may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communications, such as through the Internet, an intranet, an Ethernet network, a wireline network, a wireless network, a mobile communications network, and/or another communication network, such as communications network 118. Each remote device 106-112 may include an agent 114, which may be an application and/or module capable of collecting or otherwise monitoring the various assets of the enterprise system 104 that may be executing on the remote devices 106-112. The agent 114 may be stored locally on the same device on which the particular asset being monitored is located, or elsewhere.

Figure 2:
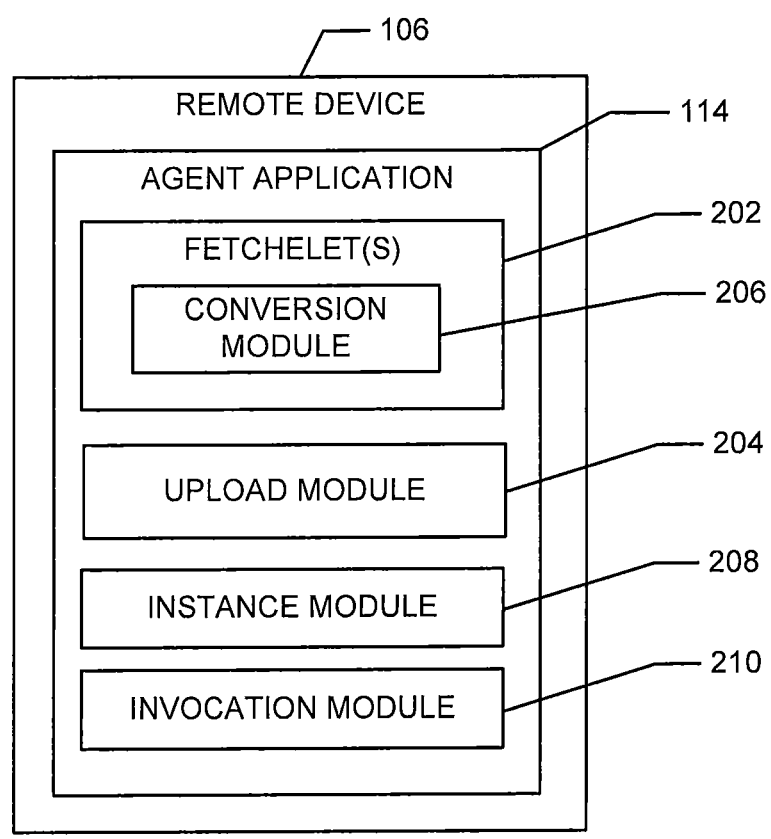
FIG. 2 is a block diagram of a remote device in accordance with one aspect of the present disclosure.

As illustrated in FIG. 2, each agent 114 may include or otherwise implement one or more service clients, which provide a mechanism for the assets of an enterprise system to consume a service. In particular, each agent may implement one or more fetchlet(s) 202, which are a particular type of service client. A fetchlet is a specific type of service client for capturing or collecting the data corresponding to the enterprise system. Further, a fetchlet is a parameterized data access mechanism that takes arguments (such as a script, a SQL statement, and a target instance's properties) as input and returns formatted data. Each fetchlet handles a specific type of data access. Stated differently, each fetchlet provides a specific service invocation based on its data access mechanism. To dictate how a particular fetchlet may access a particular service, the fetchlet defines a specific set of standard properties and/or implements specific protocols that may be used to communicate various details corresponding to a service and/or service instance, such as service endpoints, security policies, credentials, etc. For example, to access a database for the enterprise system, a Standard Query Language fetchlet may be used. As another example, to access an Oracle Application Server, a JMX fetchlet may be implemented or used.

In one particular embodiment, the agent 114 may include a Representational State Transfer ("RESTful") services fetchlet. RESTful services represent a design idiom that embraces a client-server architecture in which the web services are viewed as resources and can be identified by their URLs. Thus, the RESTful fetchlet obtains, monitors, or otherwise captures data exposed by RESTful services. Additionally, the agent 114 may include a Web Services fetchlet, which exploits Simple Object Access Protocol ("SOAP") for service communication. The SOAP protocol is a specification for exchanging structured information via web services between heterogeneous devices, processes, and/or systems over a network, such as the Internet. Accordingly, the Web Services fetchlet obtains, monitors, or otherwise captures data exposed by Web Services using the SOAP protocol. In yet another embodiment, the agent 114 may include a WS-Management Service fetchlet. A WS-Management Service fetchlet represents a type of SOAP-based protocol for managing servers, devices, applications and/or various other Web services. Thus, the WS-Management Services fetchlet obtains, monitors, or otherwise captures data exposed or generated by a WS-Management Service services. WS-Management refers to a protocol (which is based on a set of standard specifications: HTTPS, SOAP over HTTP (WS-I profile), SOAP 1.2, WS-Addressing, WS-Transfer, WS-Enumeration, and WS-Eventing) to provide consistency and interoperability for management operations across different types of servers, devices and operating systems. Thus, the WS-Management Services fetchlet obtains, monitors, or otherwise captures data exposed or generated by a WS-Management compliant asset using WS-Management protocol.

Each of the different fetchlets—the RESTful fetchlet, Web Services fetchlet, and the WS-Management fetchlet—use different protocols for communicating with the various assets being monitored. The following table illustrates the three fetchlets discussed above and its corresponding communication protocol:

| Fetchlet | Communication Protocol |
|---|---|
| REST fetchlet | HTTP/1.1 |
| Web Services fetchlet | SOAP protocol |
| WS-Management fetchlet | WS-Management protocol based on the following standard specifications: HTTPS, SOAP over HTTP (WS-I profile), SOAP 1.2, WS-Addressing, WS-Transfer, WS-Enumeration, and WS-Eventing. |

Each fetchlet also provides various functionalities and data access mechanisms that may be accessed to invoke specific services. Stated differently, each fetchlet defines a set of standard service properties to specify on how to access the specific service, what data will be passed, and what output to be expected from the service. For example, the set of standard service properties may be used to communicate the service details related to various service instances, service endpoints, security policies, credentials, etc. Such service properties are passed (i.e. provided as arguments, parameters, etc.) to the fetchlet prior to invoking the desired service using the fetchlet. The table below summaries the data access mechanisms used by the various fetchlets described above:

| Fetchlet | Data Access Mechanism |
|---|---|
| REST fetchlet | RESTful protocol |
| Web Services fetchlet | SOAP protocol |
| WS-Management fetchlet | WS-Management protocol |

Each service client (e.g. fetchlet) may provide or otherwise include a property interface. A property interface represents a place and/or mechanism that enables a conversion process, such as data conversion, to take place. An Asset, which may adapt the interface, understands what to convert in order to produce the standard set of properties to access a service client. Referring to the WS-Management Service fetchlet example, the fetchlet may be invoked or otherwise activated to determine whether a property interface exists.

The fetchlet(s) 202 may include a conversion module 206 (i.e. a service client). The conversion module 206 may enable a target instance to adapt a property interface of a service client, and thereby provide a mechanism to convert the target instance's internal data to the standard set of instance properties, data access mechanisms, etc., expected by a service client, such as a fetchlet. Stated differently, the conversion module 206 may define or otherwise provide access to a property interface which may be adapted that converts the internal data of target instances to the standard set of the properties expected by a fetchlet. The conversion module 206 may be executed prior to executing and/or otherwise initiating a fetchlet so that data conversion process can take place to set the required values for the fetchlet properties which subsequently may be provided as input to the fetchlet for actual service invocation.

The agent(s) 114 may also include an instance module 208 and an invocation module 210. As will be further described below, the instance module 208 may generate or otherwise initiate, optionally in conjunction with the various processes of the management system 102, one or more target instances corresponding to various Assets. Additionally, the agent(s) 114 may include or otherwise store target information corresponding to particular target instance, such as information that may be used to uniquely identify a particular target instance, etc. The invocation module 210 may invoke one or more service clients.

Referring again to FIG. 1, the remote devices 106-112 may send, transmit, or otherwise provide data (e.g. metric, target metadata, or any data) collected at the agent(s) 114 to a management system 102. For example, the agent 114 may include an upload module 204 that may upload data from the agent(s) 114 to the management system 102. Subsequently, the management system 102 may execute a management server application 116 that, as will be described in further detail below, may extend one or more services to one or more assets of the enterprise management system 102, thereby allowing the asset to consume the service. For example, the management server application 116 may process and/or analyze the data received from the one or more remote devices 106-112 to define an adaptive interface to which target instances corresponding to various assets of the enterprise system 104 may adapt. While aspects of the present disclosure have been described as being performed using multiple devices within a computing environment, such as computing environment 100 shown in FIG. 1, it is contemplated that such aspects may be performed locally, using only a single device, such as the management system 102 and in such cases the remote device(s) and any corresponding software/hardware components are integrated into or otherwise in direct connection with the management system 102.

Figure 3:
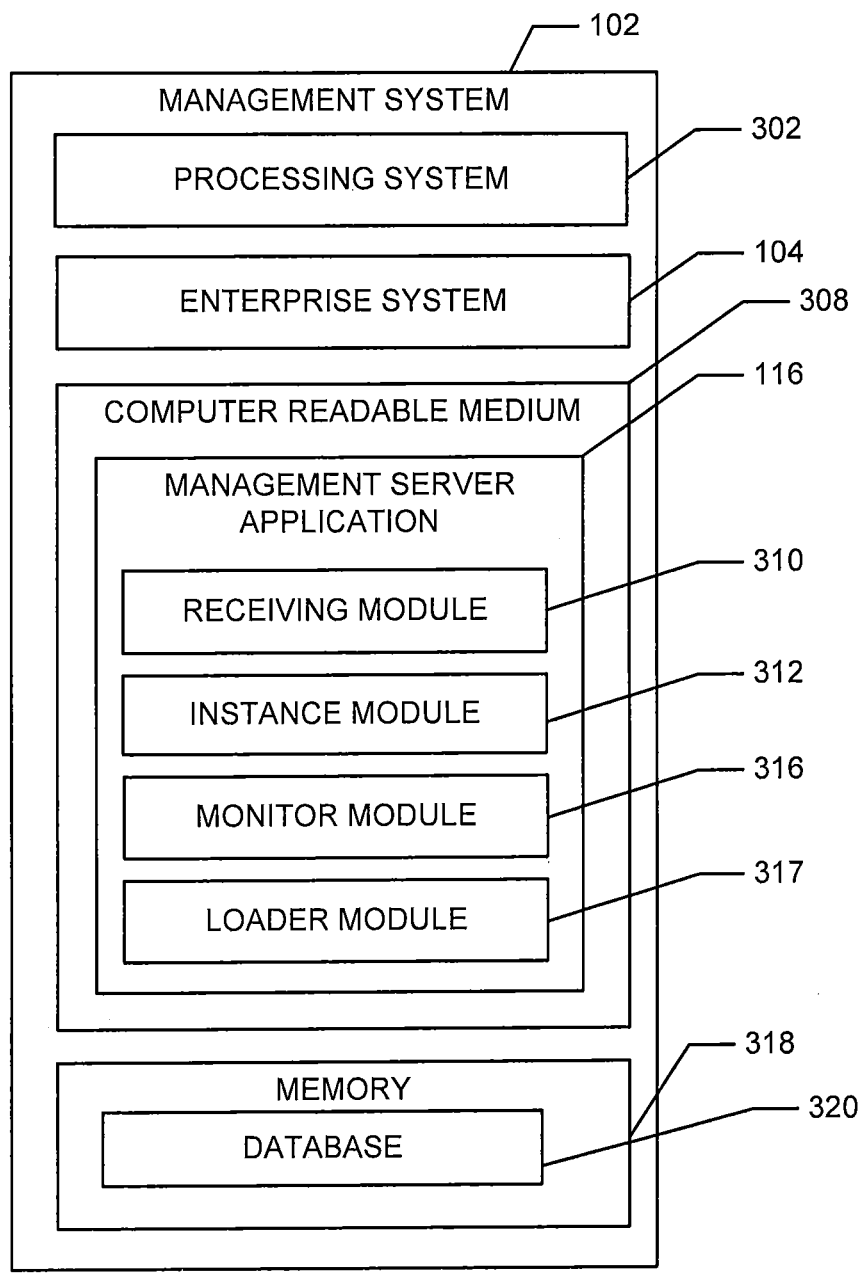
FIG. 3 is an example block diagram of a management system in accordance with one aspect of the present disclosure.
Figure 4:
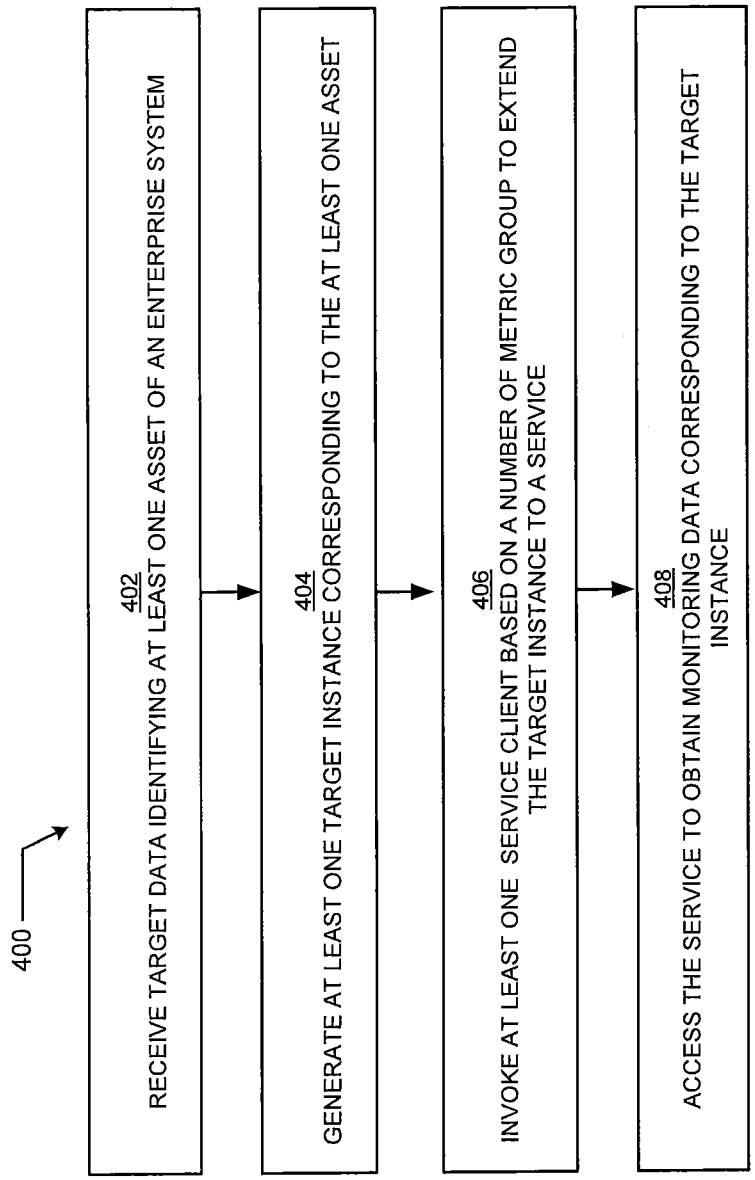
FIG. 4 is an example process for extending an enterprise system in accordance with one aspect of the present disclosure.

FIG. 3 is a block diagram illustrating the management system 102 according to aspects of the present disclosure. The management system 102 includes a processing system 302 that may be used to execute the MS system 102 to provision a service. The processing system 302 may be in communication with a memory 318. The memory 318 may include volatile and/or non-volatile memory, and provides a database 320 to store data. According to one aspect, database 320 is a general repository of data including, but not limited to, monitoring data corresponding to assets of the enterprise system 104. The database 320 may include memory and one or more processors or processing systems to receive, process, query and transmit communications and store and retrieve data. In another aspect, the database 320 may be a database server. In one particular embodiment, the database may be a content management database system and/or server.

The management system 102 may include a computer readable medium ("CRM") 308, which may include computer storage media, communication media, and/or another available computer readable medium that may store executable instructions to implement the management server application 116 and/or associated functions, processes, etc. CRM 308 may include non-transient computer storage media and communication media. By way of example and not limitation, computer storage media includes memory, volatile media, non-volatile media, removable media, and/or non-removable media implemented in a method or technology for storage of information, such as machine/computer-readable/executable instructions, data structures, program modules, or other data. Communication media includes machine/computer-readable/executable instructions, data structures, program modules, or other data. Generally, program modules include routines, programs, instructions, objects, components, data structures, etc., that perform particular tasks or implement particular abstract data types. For example, as illustrated, CRM 308 may include or otherwise store a receiving module 310, an instance module 312, a monitor module 316, and a loader module 317 of the management server application 116.

Referring now to FIGS. 1-5, in one particular embodiment, the management system 102 may launch, run, execute, interpret, or otherwise perform the logical instructions and/or processes of the management server application 116, such as process 400, which depicts an example method and/or process for defining and/or generating an adaptive interface to enable the integration of services and various assets of an enterprise system.

Process 400 begins with receiving target data identifying one or more assets to be monitored by the management server application 116 (operation 402). As illustrated in FIG. 3, a receiving module 310 may receive the target data identifying one or more assets of the enterprise system 104. For example, the receiving module 310 may receive target data identifying three different databases and an application server: D1; D2; D3; and A1. The target data may include a target metadata file and a set of instance properties corresponding to the three different databases and a target metadata file and set of instance properties corresponding to the application server. Example metadata information within the target metadata file corresponding to the databases may include: the location of the db installation, the monitor username and password, the role, database ID (e.g. Oracle database SID), ports information, a preferred connect string, access privilege information (e.g. DBA role such as normal vs. SYSDBA), listener machine name, etc. The metadata may include metrics that may be received, collected, interpreted, etc., by a fetchlet and/or a service client. For example, metrics for a "EM Database Services" may include: Application Wait Time(seconds), CPU Utilization (%), Cluster Wait Time(seconds), Concurrency Wait Time(seconds), DB CPU(seconds), DB Time(seconds), Elapsed time(second), Execute Count, Physical Reads, Physical Writes, Transactions, User Calls, User I/O Wait Time(seconds), and data collection time.

One or more target instances are generated for the identified assets (operation 404). For example, as illustrated in FIG. 3, an instance module 312 may process the input received by the receiving module 310 to generate one or more target instances corresponding to the identified assets. In one embodiment, the target instances may be provided to and/or otherwise generated at the remote devices 106-112 on which the corresponding business asset currently exists, such as via the instance module 208. Referring to the example above, four different target instances would be generated, one corresponding to each of the four different databases that were identified from the target data. Accordingly, a target instance for databases: A, B, C, and D would be generated by the instance module 312, and each target instance would be located on the remote devices 106, where each of databases A, B, C, and D currently exist. The instance module 312 may include target information that uniquely identifies each target instance. A loader module 317 may receive metric information corresponding to a particular target instance, process the metric information, and store the metric information in a database, data store, or repository, etc.

Referring again to FIG. 4, at least one service client is invoked based on a number of metric groups to extend the target instance to at least one service (operation 406). In particular, an invocation module 210 may invoke or otherwise call at least one service. To properly extend the target instance to the service, the invocation module 210 may cause the conversion module 206 to initiate one or more service clients (e.g. fetchlets) of the agent(s) 114 based on the metric information received by the receiving module 310, such as a metric group. Subsequently, the conversion module 206 may extend the service to the target instance by defining an adaptive interface.

Figure 5:
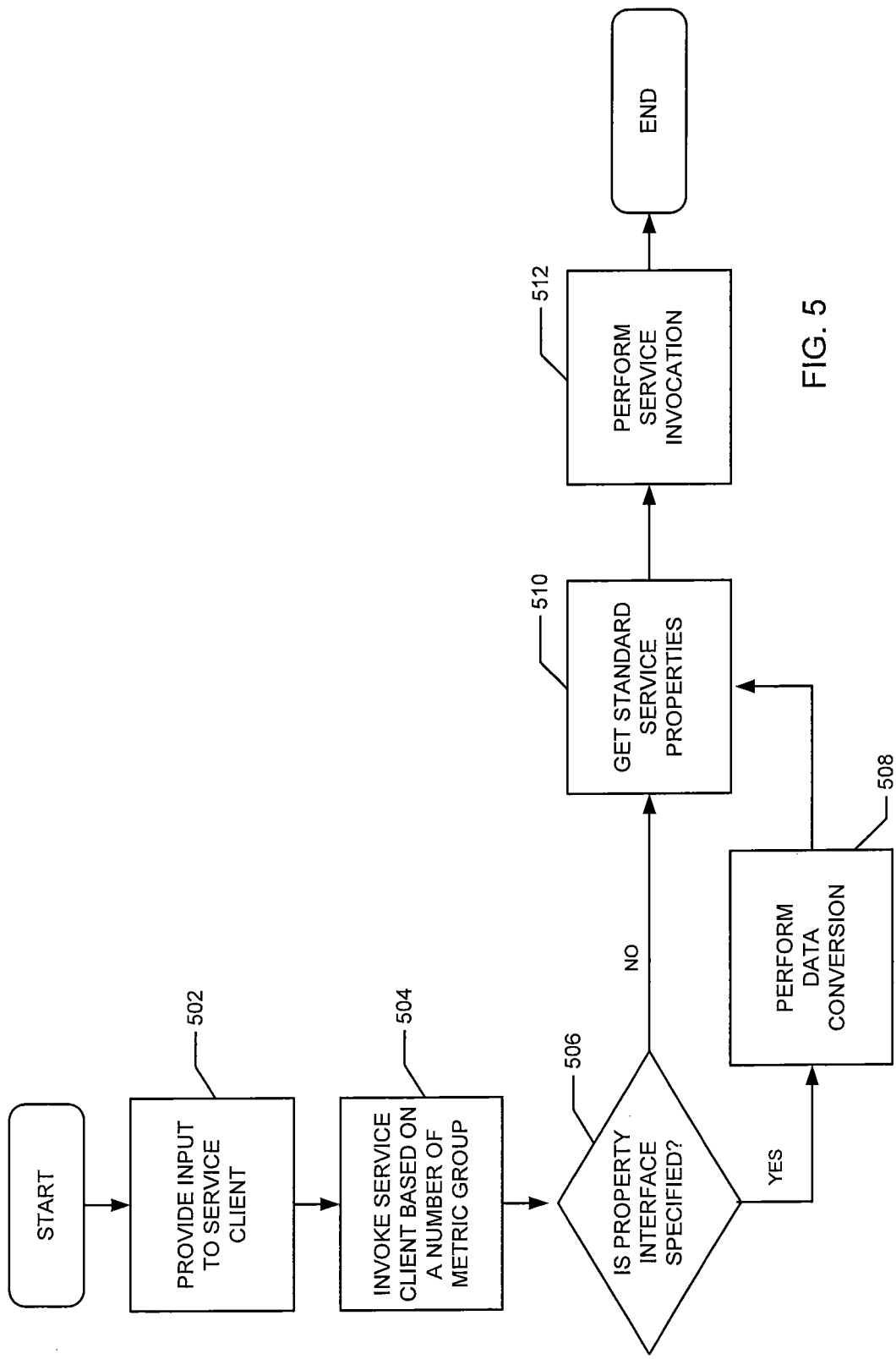
FIG. 5 is an example process for providing an adaptive interface in accordance with one aspect of the present disclosure.

FIG. 5 is an example process that may be performed by the conversion module 206 for defining an adaptive interface. As illustrated in FIG. 5, input is received corresponding to a particular service client (operation 502). More specifically, the conversion module 206 may receive input including a mixed set of instance properties. In particular, a portion of the instance properties may be standard properties corresponding to the service client and a portion of the properties may be specific to the specific asset of an enterprise system (e.g. a specific target instance). For example, the conversion module 206 may receive input corresponding to a WS-Management Service fetchlet (i.e., the service client) for monitoring a web server of the enterprise system 104. The input may include a portion of standard instance properties corresponding to the WS-Management Service fetchlet and a set of instance properties specific to the web server.

At least one service client may be invoked, such as based on a metric group (operation 504). Subsequently, any properties corresponding to the service client may be analyzed and/or otherwise processed to determine whether a property interface is specified (operation 506). In one particular embodiment, the conversion module 206 may process, parse and/or analyze the input received to determine whether any of the instances properties indicated the existence of a property interface corresponding to the service client.

When a property interface exists, data conversion is performed (operation 508). During data conversion any specific instance properties corresponding to a target instance, application, application module, asset, and/or function of an enterprise system are converted to standard properties. For example, a "Preferred Connect String" instance property corresponding to a database target instance may be constructed from a host, port, and database ID properties. When no property interface exists, the standard properties corresponding to the service client are obtained (operation 510). For example, referring to the WS-Management Service fetchlet, all of the standard properties corresponding to the WS-Management Service fetchlet would be obtained. All of the standard properties are used to invoke and/or otherwise activate the corresponding specific service may be obtained. Finally, the service is invoked (operation 512).

Referring again to FIG. 4, after any conversion has been completed, the service is accessed and/or otherwise consumed thereby enabling the one or more target instances to be monitored to obtain monitoring data (operation 408). As shown in FIG. 3, a monitor module 316 may receive monitoring information related to the one or more target instances via the invoked service. After a target instance of a particular asset has been created, the instance properties corresponding to the target instance will provide enough information to inform/instruct any Agent monitoring the target instance how to use its available components, such as a fetchlet, to communicate with the corresponding asset. Monitoring data may be collected periodically according to the configured collection schedule using service consumption and then uploaded to the management system 102. Any data uploaded, such as monitoring information and/or monitoring data etc., may be exposed as metrics which may be provided for display, such as on a user interface. Additionally, thresholds and alerts may be associated with metric values for triggering monitoring notification.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for extending services to existing systems comprising:
    invoking, using at least one processing device, a service client to enable at least one asset of an enterprise system to access at least one service by:
        accessing target data corresponding to at least one target instance to determine whether a property interface is specified, the at least one target instance corresponding to the at least one asset;
        when a property interface is specified, using the property interface to convert a portion of the target data to a standard format corresponding to the service client; and
        invoking an instance of the service based on the standardized target data.

2. The method of claim 1, further comprising consuming, at the at least one processing device, the service using the at least one asset to obtain monitoring data.

3. The method of claim 1, further comprising receiving, at the least one processing device, the target data as a plug-in to identify the at least one asset of the enterprise system.

4. The method of claim 1, wherein the target data comprises a target metadata file including metric group definitions and a set of instance properties describing how to access the at least one asset.

5. The method of claim 1, wherein the service client is a fetchlet.

6. The method of claim 5, wherein the fectchlet is a RESTful fetchlet.

7. The method of claim 1, wherein the at least one asset is selected from the group consisting of an application module, an application, an application server, a web server, and a database.

8. A system for extending services to existing systems comprising:
   at least one processor to:
   invoke a service client to enable at least one asset of an enterprise system to access at least one service by:
   accessing target data corresponding to at least one target instance to determine whether a property interface is specified, the at least one target instance corresponding to the at least one asset;
   when a property interface is specified, use the property interface to convert-a portion of the target data to a standard format corresponding to the service client; and
   invoke an instance of the service based on the standardized target data.

9. The system of claim 8, wherein the at least one processor is further configured to consume the service using the at least one asset to obtain monitoring data.

10. The system of claim 8, wherein the at least one processor is further configured to receive the target data as a, plug-in to identify the at least one asset of the enterprise system.

11. The system of claim 8, wherein the target data comprises a target metadata file including metric group definitions and a set of instance properties describing how to access the at least one asset.

12. The system of claim 8, wherein the service client is a fetchlet.

13. The system of claim 12, wherein the fetchlet is a WS-Management Services fetchlet.

14. The system of claim 8, wherein the at least one asset is selected from the group consisting of an application module, an application, an application server, a web server, and a database.

15. A non-transitory computer readable medium encoded with a management server application comprising modules executable by a processor, the modules comprising:
   a service module to invoke a service client to enable at least one asset of an enterprise system to access at least one service by:
   accessing target data corresponding to at least one target instance to determine whether a property interface is specified, the at least one target instance corresponding to the at least one asset;
   when a property interface is specified, using the property interface to convert a portion of the target data to a standard format corresponding to the service client; and
   invoking an instance of the service based on the standardized target data.

16. The non-transitory computer readable medium of claim 15, further comprising a monitor module to consume the service using the at least one asset to obtain monitoring data.

17. The non-transitory computer readable medium of claim 15, further comprising a receiving module to receive the target data as a plug-in to identify the at least one asset of the enterprise system.

18. The non-transitory computer readable medium of claim 15, wherein the target data comprises a target metadata file including metric group definitions and a set of instance properties describing how to access the at least one asset.

19. The non-transitory computer readable medium of claim 15, wherein the service client is a fetchlet.

20. The non-transitory computer readable medium of claim 15, wherein the fetchlet is a Web Services fetchlet.

21. The non-transitory computer readable medium of claim 15, wherein the at least one asset is selected from the group consisting of an application module, an application, an application server, a web server, and a database.

* * * * *